United States Patent
Betz et al.

(10) Patent No.: US 7,062,403 B2
(45) Date of Patent: Jun. 13, 2006

(54) ROTATIONAL SPEED SENSOR COMPRISING A VIBRATING GYROSCOPE AND METHOD FOR EQUALIZING THE ROTATIONAL SPEED SENSOR

(75) Inventors: Uwe Betz, Karben (DE); Heinz-Werner Morell, Kaiserslautern (DE); Raphael Skorupa, Bad Homburg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/527,124

(22) PCT Filed: Jun. 2, 2004

(86) PCT No.: PCT/EP2004/050993

§ 371 (c)(1),
(2), (4) Date: Mar. 8, 2005

(87) PCT Pub. No.: WO2005/001381

PCT Pub. Date: Jan. 6, 2005

(65) Prior Publication Data

US 2006/0009946 A1 Jan. 12, 2006

(30) Foreign Application Priority Data

Jun. 30, 2003 (DE) ................................. 103 29 509

(51) Int. Cl.
*G01P 3/00* (2006.01)
(52) U.S. Cl. ........................................... 702/145
(58) Field of Classification Search ................ 702/145
See application file for complete search history.

(56) References Cited

U.S. PATENT DOCUMENTS

| 5,383,362 | A | * | 1/1995 | Putty et al. ............... | 73/504.01 |
| 5,444,641 | A | | 8/1995 | White | |
| 5,616,864 | A | * | 4/1997 | Johnson et al. .......... | 73/504.04 |
| 6,064,169 | A | | 5/2000 | Ward et al. | |
| 6,714,025 | B1 | | 3/2004 | Mohaupt et al. | |

FOREIGN PATENT DOCUMENTS

| EP | 1 233 249 A2 | | 8/2002 |
| EP | 1233249 | * | 8/2002 |

\* cited by examiner

*Primary Examiner*—Michael Nghiem
*Assistant Examiner*—Cindy D. Khuu
(74) *Attorney, Agent, or Firm*—Cohen, Pontani, Lieberman & Pavane

(57) ABSTRACT

The invention relates to a rotational speed sensor including a vibrating gyroscope which is part of a primary and a secondary control circuit. The control circuit, respectively, amplifies, demodulates, remodulates an output signal of the vibrating control circuit and supplies it again to the vibrating control circuit as an exciter signal and the primary control circuit provides most of the energy required for maintaining the vibration. A frequency synthesiser including mechanism for adjusting the phase length of the carrier is provided in order to produce carriers which are used to demodulate and remodulate. Said carrier forms, a phase control circuit in conjunction with a phase comparison circuit. The amplified output signal in the primary control circuit and a comparison carrier produced by the frequency synthesiser can be guided to the phase comparison circuit. The invention also relates to a method for equalising the inventive rotational speed sensor.

11 Claims, 2 Drawing Sheets

ROTATIONAL SPEED SENSOR COMPRISING A VIBRATING GYROSCOPE AND METHOD FOR EQUALIZING THE ROTATIONAL SPEED SENSOR

CROSS REFERENCE TO RELATED APPLICATIONS

This is a U.S. national stage of application No. PCT/EP2004/050993, filed on 2 Jun. 2004. Priority is claimed on the following application: Country: Germany, Application No.: 103 29 509.7, Filed: 30 Jun. 2003.

BACKGROUND OF THE INVENTION

1. Field of the Invention

The invention relates to a rotational speed sensor having a vibrating gyroscope which is part of a primary control loop and of a secondary control loop, where the control loops respectively amplify an output signal from the vibrating gyroscope, demodulate it, remodulate it and supply it back to the vibrating gyroscope as excitation signal, and where the primary control loop provides the predominant part of the energy for maintaining the vibration, and to a method for trimming this rotational speed sensor.

2. Description of Prior Art

The vibrating gyroscope used in the rotational speed sensors based on the preamble is a narrowband band filter and is operated at resonance, for example at a frequency of 14 kHz. The rotational speed signal which is to be generated using the rotational speed sensor is taken from the secondary control loop and is dependent on the amplitude and phase of the output signal from the vibrating gyroscope in the secondary control loop. Depending on component tolerances, it is necessary to trim the control loops.

SUMMARY OF THE INVENTION

The invention allows exact operation of the control loops, particularly observation of the resonance conditions, by virtue of there being, for the purpose of producing carriers which are used for demodulation and for remodulation, a frequency synthesizer having means for setting the phases of the carriers in relation to one another, and by virtue of the frequency synthesizer and a phase comparison circuit together forming a phase locked loop, the phase comparison circuit being able to be supplied with the amplified output signal in the primary control loop and with a comparative carrier produced by the frequency synthesizer.

Preferably, a first carrier can be supplied to a synchronous demodulator in the primary control loop and a second carrier can be supplied to a modulator in the primary control loop. In this case, the resonance condition is observed in that when the phase locked loop is locked the phase of the second carrier is chosen such that the phase rotation of the total primary control loop, including the vibrating gyroscope, meets the resonance condition.

Although the demodulator in the primary control loop has no direct influence on the resonance in the primary circuit, it has been found to be beneficial if additionally the phase of the first carrier corresponds to that of the amplified output signal in the primary control loop.

Measures for operating the secondary control loop are advantageously provided such that a third and a fourth carrier are phase shifted through 90° with respect to one another and can be supplied to a respective synchronous demodulator in a first and in a second path of the secondary control loop, and that a fifth and a sixth carrier are phase shifted through 90° with respect to one another and can be supplied to a respective modulator in the first and second paths.

In this context, both the resonance condition in the secondary control loop and maximization of the amplitude of the rotational speed signal are implemented if when the phase locked loop is locked the difference between the phases of the third and fourth carriers and the phases of the fifth and sixth carriers is chosen such that the resonance condition is met in the secondary control loop, and if the phases of the third to sixth carriers are chosen with respect to the comparative carrier such that a rotational speed signal which can be picked off from the synchronous demodulator in the first path via a filter adopts a maximum for a given rotation of the vibrating gyroscope.

In one advantageous refinement of the inventive rotational speed sensor, a nonvolatile memory is provided for phase values stipulated in a previous trimming process, from which memory the values can be read and supplied to the frequency synthesizer when the rotational speed sensor is turned on.

Fundamental components of the control loops, particularly analog components, such as amplifiers and filters, have a temperature-dependent delay time. In the case of the inventive rotational speed sensor, trimming which has been performed once at a particular temperature can be adapted to suit the respective temperature by virtue of temperature-dependent phase correction of the carriers being performed.

Since the resonant frequency of the vibrating gyroscope is temperature-dependent, it is possible to dispense with a separate temperature sensor for this if temperature-dependent phase correction is performed using a change in the oscillation frequency of the vibrating gyroscope as a measure of the temperature change.

Should the temperature dependency also be subject to nonnegligible manufacturing tolerances, provision may be made in this context for the nonvolatile memory to store temperature dependencies.

The invention also comprises a method for trimming a rotational speed sensor in which the phase of a carrier for a modulator in the primary control loop is set to meet a resonance condition in the primary control loop, after that the phase of two carriers which are phase shifted through 90° with respect to one another for synchronous demodulators in the secondary control loop is set in relation to the phase of two further carriers which are phase shifted through 90° with respect to one another for modulators in the secondary control loop in order to attain a resonance condition in the secondary control loop, and when the vibrating gyroscope is set in rotation the phases of the carriers for the synchronous demodulators and for the modulators in the secondary control loop are then adjusted in the same sense in relation to the comparative carrier such that the rotational speed signal is at a maximum.

BRIEF DESCRIPTION OF THE DRAWINGS

The invention permits numerous embodiments, one of these is shown schematically in the drawing by means of a plurality of figures and is described below. In the drawings.

DETAILED DESCRIPTION OF THE PREFERRED EMBODIMENTS

Although the exemplary embodiment and parts thereof are shown as block diagrams, this does not mean that the inventive arrangement is limited to implementation using individual circuits which correspond to the blocks. Rather, the inventive arrangement can be implemented in particularly advantageous fashion using large-scale integrated circuits. In this case, it is possible to use microprocessors which, with suitable programming, perform the processing steps in the block diagrams.

Figure 1:
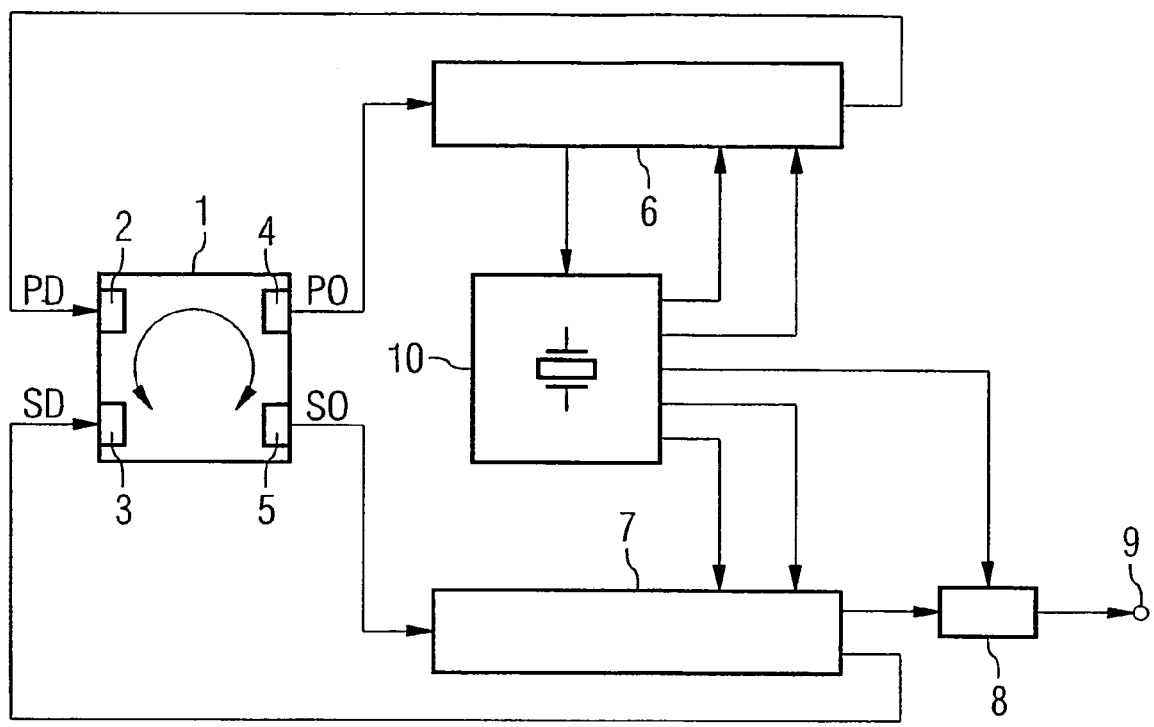
FIG. 1 is a block diagram of a rotational speed sensor.

FIG. 1 shows a block diagram of an arrangement with a vibrating gyroscope 1 having two inputs 2, 3 for a primary excitation signal PD and a secondary excitation signal SD. The excitation is produced by suitable transducers, for example electromagnetic transducers. The vibrating gyroscope also has two outputs 4, 5 for a primary output signal PO and a secondary output signal SO. These signals reproduce the respective vibration at physically offset points on the gyroscope. Such gyroscopes are known from EP 0 307 321 A1, for example, and are based on the effect of the Coriolis force.

The vibrating gyroscope 1 represents a high quality filter, with the section between the input 2 and the output 4 being part of a primary control loop 6 and the section between the input 3 and the output 5 being part of a secondary control loop 7. The primary control loop 6 is used to excite oscillations at the resonant frequency of the vibrating gyroscope, for example 14 kHz. In this case, the excitation is produced in an axis of the vibrating gyroscope with respect to which the direction of oscillation used for the secondary control loop is offset through 90°. In the secondary control loop 7, the signal SO is split into two quadrature components, one of which is supplied via a filter 8 to an output 9 from which a signal which is proportional to the rotational speed can be picked off.

In both control loops 6, 7, a fundamental part of the signal processing is performed digitally. The signals required for the signal processing are produced in a crystal-controlled digital frequency synthesizer 10 whose clock frequency is 14.5 MHz in the example shown.

The secondary control loop 7 contains an amplifier 25, an antialiasing filter 26 and an analog/digital converter 27. Multipliers 28, 29 to which the amplified and digitized signal SO with the as yet unseparated components I and Q and carriers T3 and T4 are supplied are respectively used for synchronous demodulation and hence splitting into a real part and an imaginary part.

Both components then respectively pass through a (sinx/x) filter 30, 31 and a low-pass filter 32, 33. The filtered real part is used by a conditioning circuit 34 to derive two signals R1 and R2 which represent the rotational speed which is to be measured using the rotational speed sensor. The signals R1 and R2 differ in that the signal R2 does not adopt the total amplitude range of 0V to +5V, for example, which the circuitry used allows. To output an error message, the signal R2 is put at zero, which the connected system recognizes as an error message.

The low-pass filters 32, 33 have a respective adder 35, 36 connected downstream of them which can be used to add correction variables. Multipliers 37, 38 are then used to remodulate the two components Si and Sq with carriers T5 and T6. An addition operation at 39 produces another 14-kHz oscillation which an output driver 40 converts into a current which is suitable for exciting the vibrating gyroscope 1.

Figure 2:
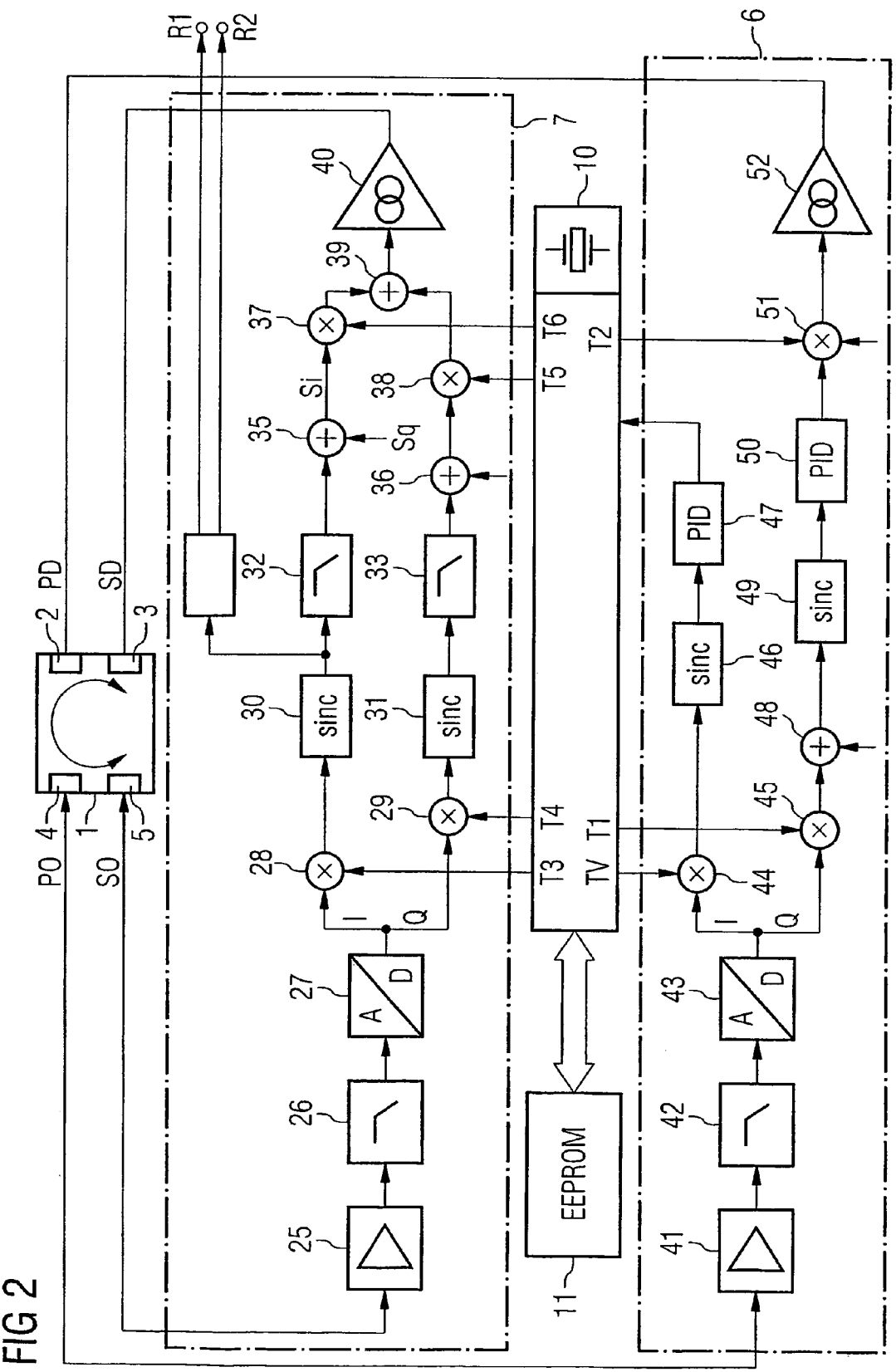
FIG. 2 is a schematic block diagram of the primary and secondary control loops, including the frequency synthesizer.

FIG. 2 also shows the primary control loop 6, in which the output signal PO from the vibrating gyroscope 1 is routed to an analog/digital converter 43 via an amplifier 41 and an antialiasing filter 42. In a similar manner to in the case of the secondary control loop, the output signal from the analog/digital converter 43 is supplied to two multipliers 44, 45 (synchronous demodulators). The synchronous demodulator 44 is followed by a (sinx/x) filter 46 and a PID element 47. The output of the PID element is connected to an input on the frequency synthesizer 10, in which various signals are derived in inherently known fashion by means of frequency division of a crystal-generated clock frequency of 14.5 MHz, for example.

The multiplier, which serves as a phase comparison circuit, and the frequency synthesizer 10, the filter 46 and the PID element 47 together form a phase locked loop (PLL) which prompts the frequency of the carriers to be regulated such that the phase of the comparative carrier Tv adopts a prescribed relationship to the output signal from the analog/digital converter 43—for example 90°. Besides a crystal oscillator, the frequency synthesizer 10 contains programmable counters and logic circuits, so that the frequency and the phase can be set using supplied control signals.

Since frequency synthesizers are known per se, reference is made in the present context merely to the fact that the clock signals Tv, T1 to T6 generated by the frequency synthesizer 10 have the same frequency, which is dependent on the phase locked loop, but can be set in terms of their phase with respect to the comparative carrier Tv. The data for these settings are taken from an EEPROM 11.

A further path in the primary control loop contains a further multiplier 45, an adder 48, a (sinx/x) filter 49 and a PID element 50. This is followed by a multiplier 51 as modulator, which modulates the carrier T2 with the output signal from the PID element 50 and forwards it to a circuit 52 which supplies the excitation signal PD in the form of a current to the input 2 of the vibrating gyroscope 1.

To trim the phases of the carrier T1 to T6, first of all, after the phase locked loop has locked, appropriate values are input from a trimming device (not shown) in order to adjust the phase of the carrier T2 in the frequency synthesizer 10 until optimum resonance conditions prevail in the primary loop. In addition, it is also possible to set the phase of the carrier T1 such that at 45 only the component which is to be modulated there is demodulated, i.e. that the phase of the carrier T1 matches that of the output signal from the analog/digital converter 43.

In a second step, the secondary control loop is trimmed to resonance conditions. To this end, the clock signals T3 and T4, which form a phase angle of 90°, are adjusted with respect to the phases of the clock signals T5 and T6, which likewise form a phase angle of 90°. The relative adjustment changes the amplitudes of the two components phase shifted through 90° with respect to one another which are added using the adder 39. This changes the phase of the excitation signal SD. The change takes place until the resonance condition for the secondary control loop has been met.

In a third step, in which the vibrating gyroscope is set in rotation, the phases of the carriers T3 and T4 are shifted to an extent such that the rotational speed signal adopts a maximum. To eliminate the influence of this adjustment on the total phase, the two carriers T5 and T6 are shifted in the same way. When the trimming operation has ended, the ascertained values for the phase differences are stored in the EEPROM 11.

In addition, when needed, the EEPROM 11 can be used to store temperature dependencies for the delay times which are used with the frequency error known in the frequency synthesizer to correct phases of the clock signals T1 to T6.

What is claimed is:

1. A rotational speed sensor, comprising:
   a vibrating gyroscope arranged and dimensioned for receiving primary and secondary excitation signals and generating primary and secondary output signals;
   a primary control loop arranged and dimensioned for amplifying the primary output signal, demodulating the amplified primary output signal, remodulating the demodulated primary output signal, and sending the demodulated primary output signal to said vibrating gyroscope as the primary excitation signal;
   a secondary control loop arranged and dimensioned for amplifying the secondary output signal, demodulating the amplified secondary output signal, remodulating the demodulated secondary output signal, and sending the demodulated secondary output signal to said vibrating gyroscope as the secondary excitation signal;
   a frequency synthesizer connected to the primary and secondary control and arranged and dimensioned for producing carriers for demodulation and remodulation and setting phases of the carriers in relation to one another, said carriers comprising a comparative carrier for said primary control loop; and
   a phase comparison circuit arranged in said primary control loop for receiving the amplified primary output signal and the comparative carrier produced by said frequency synthesizer, said phase comparison circuit and frequency synthesizer forming a phase-locked loop.

2. The rotational speed sensor of claim 1, wherein said primary control loop comprises a synchronous demodulator and a modulator and said carriers further comprise first and second carriers, said frequency synthesizer being arranged and dimensioned for supplying the first carrier to said synchronous demodulator and the second carrier to said modulator.

3. The rotational speed sensor of claim 2, wherein said frequency synthesizer is arranged and dimensioned for applying a phase to the second carrier so that the phase rotation of said primary control loop including the vibrating gyroscope meets the resonance condition when said phase locked loop is locked.

4. The rotational speed sensor of claim 3, wherein said frequency synthesizer is arranged and dimensioned for applying a phase to the first carrier that corresponds to that of the amplified output signal in the primary control loop.

5. The rotational speed sensor of claim 2, wherein said carriers further comprise third through sixth carriers and said secondary control loop comprises first and second paths, each of said first and second paths having respective synchronous demodulators and modulators, wherein the third and fourth carriers are phase shifted through 90° with respect to one another and applied to respective synchronous demodulators in said first and second paths of said secondary control loop, and said fifth and sixth carriers are phase shifted through 90° with respect to one another and supplied to respective modulators in said first and second paths.

6. The rotational speed sensor of claim 5, wherein said frequency synthesizer is arranged and dimensioned such that a phase difference between the phases of the third and fourth carriers and the phases of the fifth and sixth carriers is applied so that the resonance condition is met in said secondary control loop when said phase locked loop is locked, and the phases of the third to sixth carriers are arranged with respect to the comparative carrier such that a rotational speed signal which can be picked off from the synchronous demodulator in the first path via a filter adopts a maximum for a given rotation of the vibrating gyroscope.

7. The rotational speed sensor of claim 1, further comprising a nonvolatile memory connected to said frequency synthesizer storing phase values stipulated by said frequency synthesizer in a previous trimming process, wherein the values stored in said memory are readable by said frequency synthesizer when the rotational speed sensor is turned on.

8. The rotational speed sensor of claim 7, wherein said frequency synthesizer is arranged and dimensioned for performing temperature-dependent phase correction of the carriers.

9. The rotational speed sensor of claim 8, wherein said frequency synthesizer is arranged and dimensioned for using a change in the oscillation frequency of said vibrating gyroscope as a measure of the temperature change for performing the temperature-dependent phase correction.

10. The rotational speed sensor of claim 8, wherein said nonvolatile memory stores temperature dependencies.

11. A method for trimming a rotational speed sensor, said rotational speed sensor comprising a vibrating gyroscope arranged and dimensioned for receiving primary and secondary excitation signals and generating primary and secondary output signals, a primary control loop arranged and dimensioned for amplifying the primary output signal, demodulating the amplified primary output signal, remodulating the demodulated primary output signal, and sending the demodulated primary output signal to said vibrating gyroscope as the primary excitation signal, a secondary control loop arranged and dimensioned for amplifying the secondary output signal, demodulating the amplified secondary output signal, remodulating the demodulated secondary output signal, and sending the demodulated secondary output signal to said vibrating gyroscope as the secondary excitation signal, a frequency synthesizer connected to the primary and secondary control and arranged and dimensioned for producing carriers for demodulation and remodulation and setting phases of the carriers in relation to one another, said carriers comprising a comparative carrier for said primary control loop, and a phase comparison circuit arranged in said primary control loop for receiving the amplified primary output signal and the comparative carrier produced by said frequency synthesizer, said phase comparison circuit and frequency synthesizer forming a phase-locked loop, said method comprising the steps of:
   setting the phase of a carrier for a modulator in the primary control loop to meet a resonance condition of the primary control loop;
   setting the phase of two carriers which are phase shifted through 90° with respect to each other for synchronous demodulators in the secondary control loop relative to the phase of another two carriers which are phase shifted through 90° with respect to each other for modulators in the secondary control loop for attaining a resonance condition in the secondary control loop; and
   adjusting the phases of the carriers for the synchronous demodulators and the modulators in the secondary control loop relative to a comparative carrier when the vibrating gyroscope is set into rotation such that the rotational speed signal is at a maximum.

* * * * *